United States Patent
Barrett et al.

(10) Patent No.: US 9,410,813 B2
(45) Date of Patent: *Aug. 9, 2016

(54) COURSE-BASED PLACE SEARCHING (71) Applicant: CloudCar, Inc., Mountain View, CA (US)

(72) Inventors: Peter Barrett, Palo Alto, CA (US); Bruce Leak, Los Altos Hills, CA (US); Konstantin Othmer, Los Altos, CA (US); Zarko Draganic, Belvedere, CA (US)

(73) Assignee: CLOUDCAR, INC., East Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,156

(22) Filed: Mar. 24, 2015

(65) Prior Publication Data

US 2015/0192421 A1 Jul. 9, 2015

Related U.S. Application Data

(63) Continuation of application No. 13/735,902, filed on Jan. 7, 2013, now Pat. No. 9,002,567.

(51) Int. Cl.
*G05D 1/00* (2006.01)
*G01C 21/00* (2006.01)
*G01C 21/34* (2006.01)
*G01C 21/36* (2006.01)

(52) U.S. Cl.
CPC ............ *G01C 21/34* (2013.01); *G01C 21/3682* (2013.01)

(58) Field of Classification Search
CPC combination set(s) only.
See application file for complete search history.

(56) References Cited

U.S. PATENT DOCUMENTS

| 5,987,375 | A | 11/1999 | Tamai |
| 6,571,169 | B2 | 5/2003 | Miyaki |
| 9,002,567 | B2 * | 4/2015 | Barrett .................. G01C 21/34 701/28 |
| 2007/0233371 | A1 | 10/2007 | Stoschek et al. |
| 2008/0189033 | A1 | 8/2008 | Geelen et al. |
| 2009/0088964 | A1 | 4/2009 | Schaaf et al. |
| 2010/0063721 | A1 | 3/2010 | Won |
| 2013/0138341 | A1 | 5/2013 | Poppen et al. |
| 2013/0268892 | A1 | 10/2013 | Schaaf et al. |
| 2013/0311082 | A1 | 11/2013 | Stoschek et al. |

* cited by examiner

*Primary Examiner* — Yonel Beaulieu
(74) *Attorney, Agent, or Firm* — Maschoff Brennan (57) ABSTRACT

Course-based place searching systems and methods are described. In an embodiment, a system for performing a course-based place search may include a navigation device, a processing device, and a display. The navigation device may be configured to track a location and a course of the vehicle. The processing device may be communicatively coupled to the navigation device and may be configured to request places from a resource based at least in part on the location of the vehicle and the search criterion and to return a first one or more places received from the resource to an occupant of the vehicle. The first one or more places may be based at least in part on the course of the vehicle. The display may be communicatively coupled to the processing device. The first one or more places may be displayed on the display.

20 Claims, 7 Drawing Sheets

COURSE-BASED PLACE SEARCHING

CROSS-REFERENCE TO RELATED APPLICATIONS

This patent application is a continuation of U.S. patent application Ser. No. 13/735,902, filed Jan. 7, 2013 and issued Apr. 7, 2015 as U.S. Pat. No. 9,002,567, which is incorporated herein by reference.

BACKGROUND

1. Field

The embodiments discussed herein relate to systems and methods of performing a course-based place search.

2. Relevant Technology

Many vehicles coming off production lines today include built-in electronic devices such as built-in navigation systems. In addition to providing navigation instructions, these built-in navigation systems are often capable of performing location-based searching. Built-in navigation systems are relatively expensive and often include software and/or hardware that is already outdated by the time the vehicle is sold to the consumer who will use the vehicle.

Many consumers own mobile electronic devices ("mobile devices") such as smartphones and tablets that are commonly replaced every one or two years. One result of the relatively short lifespan of such mobile devices is that they often provide consumers with the latest, or almost the latest, and most up-to-date software and/or hardware. Such mobile devices can operate a huge variety of apps, can access online content, can often interface with mobile telephone networks, and are highly flexible. These mobile devices are often capable of providing navigation instructions and performing location-based searching.

Some functionality provided by mobile devices, such as navigation apps, may compete with the built-in electronics provided in vehicles. In many cases, the software and/or hardware of mobile devices is newer and offers better performance than the software and/or hardware of a vehicle. As a result, consumers may opt to use the mobile devices while driving for navigation instructions and to perform location-based searching that might also be provided by the vehicle. With equivalent—and often superior—functionality available via mobile devices, many consumers may opt to purchase and/or lease vehicles without built-in navigation systems.

However, the use of electronic devices while operating a vehicle can lead to operator distractions and potentially dangerous operating conditions. This sort of "distracted driving" has caused accidents, and many states now have laws forbidding or restricting interaction with mobile devices while driving. Furthermore, the National Highway Traffic Safety Administration (NHSTA) has provided guidelines to automakers to ensure that new cars discourage distracted driving. The focus of the NHSTA guidelines is to encourage drivers to keep their eyes on the road, rather than being distracted with the interface of a mobile device or vehicular device. To that end, some location-based searching functionality of electronic devices may potentially be disabled now and possibly in a more widespread manner in the future. The NHSTA guidelines are often in direct conflict with drivers' desired behavior.

For example, an operator or other occupant of a vehicle may often wish to perform location-based searching. Conventional location-based searching is often performed by providing a location and search criteria to a location-based search engine. The search engine generally returns places related to the search criteria that are located within an area centered on the provided location. Often, a list of places is provided and may be sorted by proximity to the provided location, associated ratings, relevance to the search criteria, or the like. Generally, the returned places are reviewed by the searcher, who identifies one or more of the returned places as an acceptable result. Identifying an acceptable place from the search often requires the searcher to review multiple returned places. For example, the searcher might pan and/or zoom a view of a map containing representations of the places. The map might show the relative locations of the places, while detailed information about the places might be included.

This form of location-based searching may work well in situations where a person performing the search is stationary and/or is not traveling to a particular destination. However, where the search is performed on the move, and/or when traveling to a particular destination, many of the places provided by such a search may be in a direction not in the direction of travel and/or not in the direction of the destination.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Some embodiments described herein generally relate to systems and methods of performing a course-based place search. The systems and methods may allow an occupant of a vehicle to perform a location-based search and receive results based at least in part on the vehicle's course. For example, the systems and methods may return places based on a heading, predicted route, proposed route, and/or destination of the vehicle. The returned places may be associated with locations that may be reached without a significant deviation from the vehicle's course. As a result, places that can only be reached with a significant deviation from the vehicle's course may be omitted from course-based search results. By not presenting these places to the occupants of the vehicle, the places returned in response to course-based searches may be more relevant than conventional location-based searches. A course-based search can thus allow an occupant of a vehicle to more safely and conveniently search for and identify acceptable places because the returned places are generally more relevant to the occupants.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a system for performing a course-based place search is described. The system includes a navigation device, a processing device, and a display. The navigation device is configured to track a location of the vehicle and a course of the vehicle. The processing device is communicatively coupled to the navigation device and is configured to request places from a resource based at least in part on the location of the vehicle and a search criterion and to return a first one or more places received from the resource to an occupant of the vehicle. The first one or more places returned are based at least in part on the course of the vehicle.

The display is communicatively coupled to the processing device. The first one or more places are displayed on the display.

In another example embodiment, a method of performing a course-based place search is described. The method includes tracking a location of the vehicle and a course of the vehicle. The method also includes requesting places from a resource based at least in part on the location of the vehicle and a search criterion. The method further includes returning a first one or more places received from the resource to an occupant of the vehicle. The first one or more places returned are based at least in part on the course of the vehicle.

In yet another example embodiment, a computer-readable medium is described. The computer-readable medium has computer instructions stored thereon that are executable by a processor to perform operations. The operations include tracking a location of the vehicle and a course of the vehicle. The operations also include requesting places from a resource based at least in part on the location of the vehicle and a search criterion. The operations further include returning a first one or more places received from the resource to an occupant of the vehicle. The first one or more places returned are based at least in part on the course of the vehicle.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF EMBODIMENTS

Operators and/or passengers ("occupants") of a vehicle may wish to identify potential places to eat, to buy fuel, and/or to undertake some other desired activity. Location-based searching may allow the occupants to search places located near the vehicle's location that meet a selected search criteria. In the absence of the systems and methods described herein, the location-based search may return places located in an area generally centered on the vehicle location. Many of the places returned by the location-based search may not be very relevant to the occupants, as the occupants may be unlikely to select the places. For example, many of the places may require significant backtracking and/or a significant detour to reach. Other places may not include necessary services, may not be preferred by the occupants, or the like. Including these less relevant places with the returned places may make identifying a relevant and acceptable place a cumbersome and time-consuming process. By encouraging the occupants to expend extra attention to identify an acceptable place, including less relevant places in the results of a search may increase the risk of distracted driving if the location-based search is made in a moving vehicle. In the absence of the embodiments described herein, an occupant of a vehicle wishing to make a location-based search may be forced to decide whether to risk distracted driving to do so.

The methods and systems described herein enable performance of course-based searches. Course-based searching may reduce, and possibly eliminate, the risk of distracted driving when compared to conventional location-based searching. Basing the places returned at least in part on the course of a vehicle may provide an occupant of the vehicle with relevant results from which the occupant may identify an acceptable place. The places returned may be further based at least in part on preferences of the occupant of the vehicle, information from the vehicle, or detailed information about the places, which may further increase the relevance of the places returned to the occupant.

In view of the foregoing, some embodiments described herein allow a course-based search to return relevant places to an occupant of a vehicle.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale.

Figure 1:
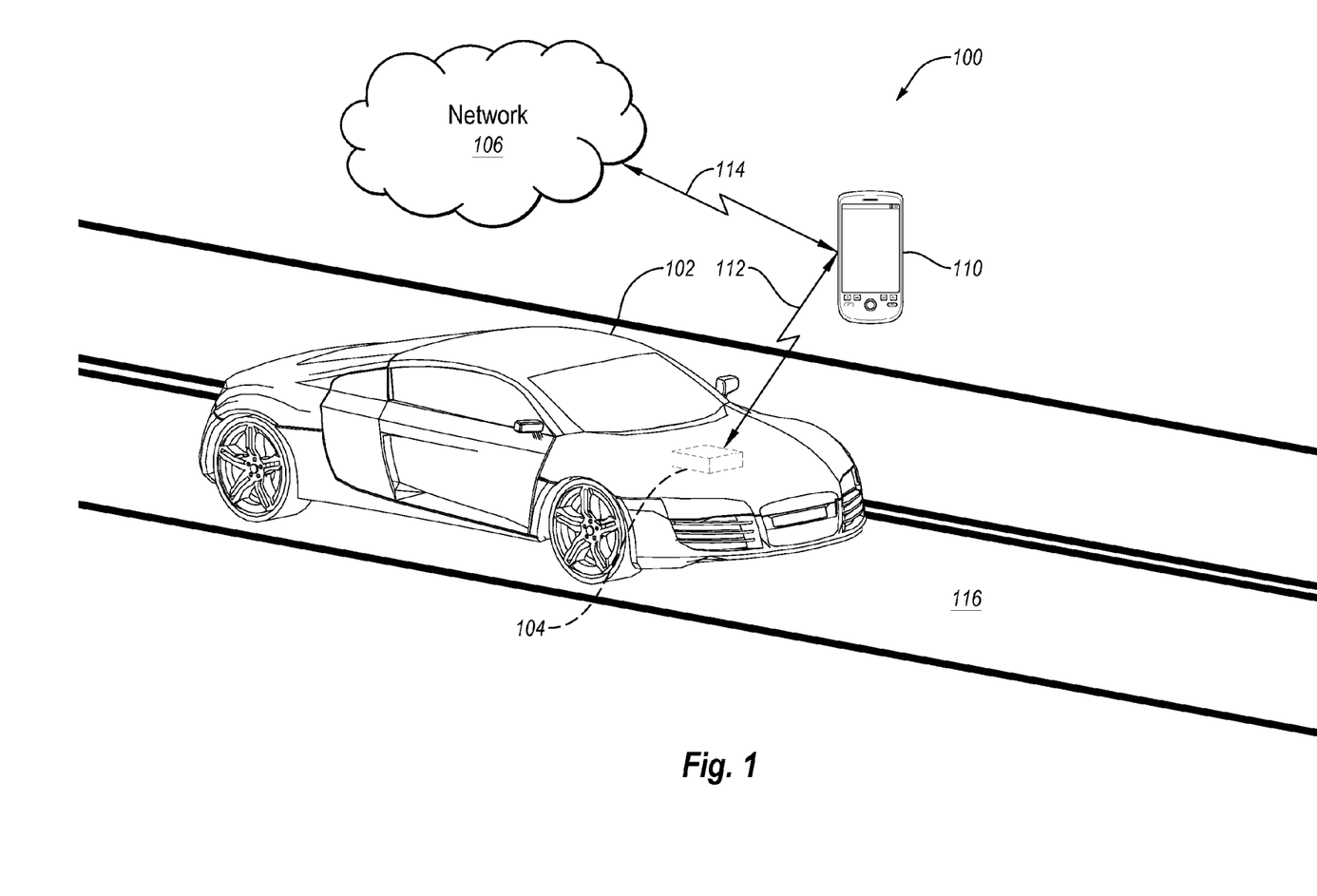
FIG. 1 is a diagrammatic view of an example operating environment including a vehicle and a mobile device.

FIG. 1 illustrates an example operating environment 100 including a vehicle 102 and a mobile device 110. Although illustrated as an automobile, the vehicle 102 may more generally include any vehicle in which it may be desirable to perform a course-based search. The vehicle 102 may include a motorized vehicle such as a car, a truck, a motorcycle, a tractor, a semi-tractor, an airplane, a motorized boat, or the like, or even a non-motorized vehicle such as a bicycle, a wheelchair, a sailboat, or the like—provided that suitable components may be present.

The vehicle 102 and/or the mobile device 110 may allow course-based searches to be performed. As used herein, the term "course" broadly applies to any information that describes an actual and/or projected change in the vehicle 102 location 116. For example, a vehicle's course may include, but is not limited to, a heading, speed, destination, predicted route and/or proposed route. Course-based searching may reduce, and possibly eliminate, the risk of distracted driving when compared to conventional location-based searching. The places returned in response to a course-based search may be based at least in part on the course of the vehicle 102. Basing the places returned at least in part on the course of the vehicle 102 may provide an occupant (not shown) of the vehicle 102 with relevant results from which the occupant may identify an acceptable place. As used herein, the term "occupant" broadly applies to operators and passengers of a vehicle. The places returned may be further based at least in part on a preference of the occupant, a status of the vehicle 102, and/or detailed information about the places, which may further increase the relevance of the places returned to the occupant.

In some embodiments, a search criterion of the course-based search may relate to energy for replacing energy reserves of the vehicle 102. For example, the search criteria may specify energy-dispensing stations that offer a particular type of energy, such as, but not limited to, gasoline, diesel fuel, liquefied petroleum gas (LPG), compressed natural gas (CNG), liquefied natural gas (LNG), methanol, ethanol, biodiesel, hydrogen, electricity, and/or other types of energy for powering a vehicle 102. Embodiments may include determining an expected range of the vehicle 102 based on the energy reserves of the vehicle and returning energy-dispensing stations that are within the expected range of the vehicle 102, further increasing the relevance of the results returned in such course-based searches. Some embodiments may improve the relevance of the returned results further by retrieving information related to the energy costs of each of the energy-dispensing stations and returning the least expensive energy-dispensing stations for replenishing the vehicle's energy reserves.

The vehicle 102 may generally include one or more devices 104 to assist with operation of the vehicle 102, to improve the vehicle's safety, to entertain occupants of the vehicle 102, to improve the comfort of occupants, or the like. For example, the devices 104 can include an audio system for audibly providing occupants with entertainment and other information. The devices 104 can also include one or more displays for visually providing occupants with information and potentially with entertainment. The displays may include instrument panels, head unit displays, and other display devices that may be found in both new and used vehicles.

A voice-recognition system may also be included as one of the devices 104 included with the vehicle 102. The voice-recognition system may include a microphone for detecting a spoken command from an occupant. An input device, such as a switch, button, touch surface, or the like, may be included in the voice-recognition system and/or the devices 104 to receive input effective to instruct the voice-recognition system to listen for a spoken command.

The devices 104 may include a navigation system for determining a location of the vehicle 102, for providing occupants with directions to a destination, or the like. The navigation system generally relies on satellite navigation systems such as the global positioning system (GPS) or the global navigation satellite system (GLONASS). However, other satellite navigation systems can be used, as can terrestrial navigation systems such as the long range navigation (LORAN) system, Wi-Fi-based positioning system (WPS), and the like. The navigation system may provide information to occupants via one or more displays and/or an audio system. In many cases, built-in navigation systems may include software and/or hardware that is already outdated by the time the vehicle 102 is sold to the consumer who will use the vehicle 102.

The vehicle 102 may communicate 112 with a mobile device 110. The mobile device 110 may be virtually any communication-enabled mobile device including, but not limited to, a portable media device, a personal digital assistant (PDA), a smartphone, a tablet computer, a laptop computer, or other communication-enabled mobile device. The mobile device 110 may include a communication interface such as an IEEE 802.11 interface, a Bluetooth interface, a Universal Mobile Telecommunications System (UMTS) interface, a Long Term Evolution Advanced (LTE-A) interface, or other mobile cellular interface. The mobile device 110 may wirelessly communicate 114 data, voice communication, SMS messages, or the like over the network 106. In some embodiments, the devices 104 may communicate over the network 106 via the mobile device 110.

Many consumers replace their mobile device 110 much more often than they replace their vehicle 102. The relatively short lifespan of such mobile devices 110 often provides consumers with access to the latest, or almost the latest, and most up-to-date software and/or hardware through their mobile device 110. Such mobile devices may generally operate a variety of apps, access online content, and can often interface with radio access networks.

In some embodiments, the vehicle 102 may be configured to wirelessly communicate 112 with the mobile device 110. Alternately or additionally, the vehicle 102 and the mobile device 110 may communicate 112 over a wired connection. In some embodiments, communication 112 between the vehicle 102 and the mobile device 110 may substantially occur as disclosed in U.S. patent application Ser. No. 13/664,212, entitled "AUTOMOBILE DATA ABSTRACTION AND COMMUNICATION" and filed Oct. 30, 2012, which application is incorporated herein by reference in its entirety.

The mobile device 110 may communicate with the devices 104 and the vehicle 102, and may project content onto one or more displays of the vehicle 102. In some embodiments, projection of content may substantially occur as disclosed in U.S. patent application Ser. No. 13/664,204, entitled "PROJECTION OF CONTENT TO EXTERNAL DISPLAY DEVICES" and filed Oct. 30, 2012, which application is incorporated herein by reference in its entirety.

Figure 2:
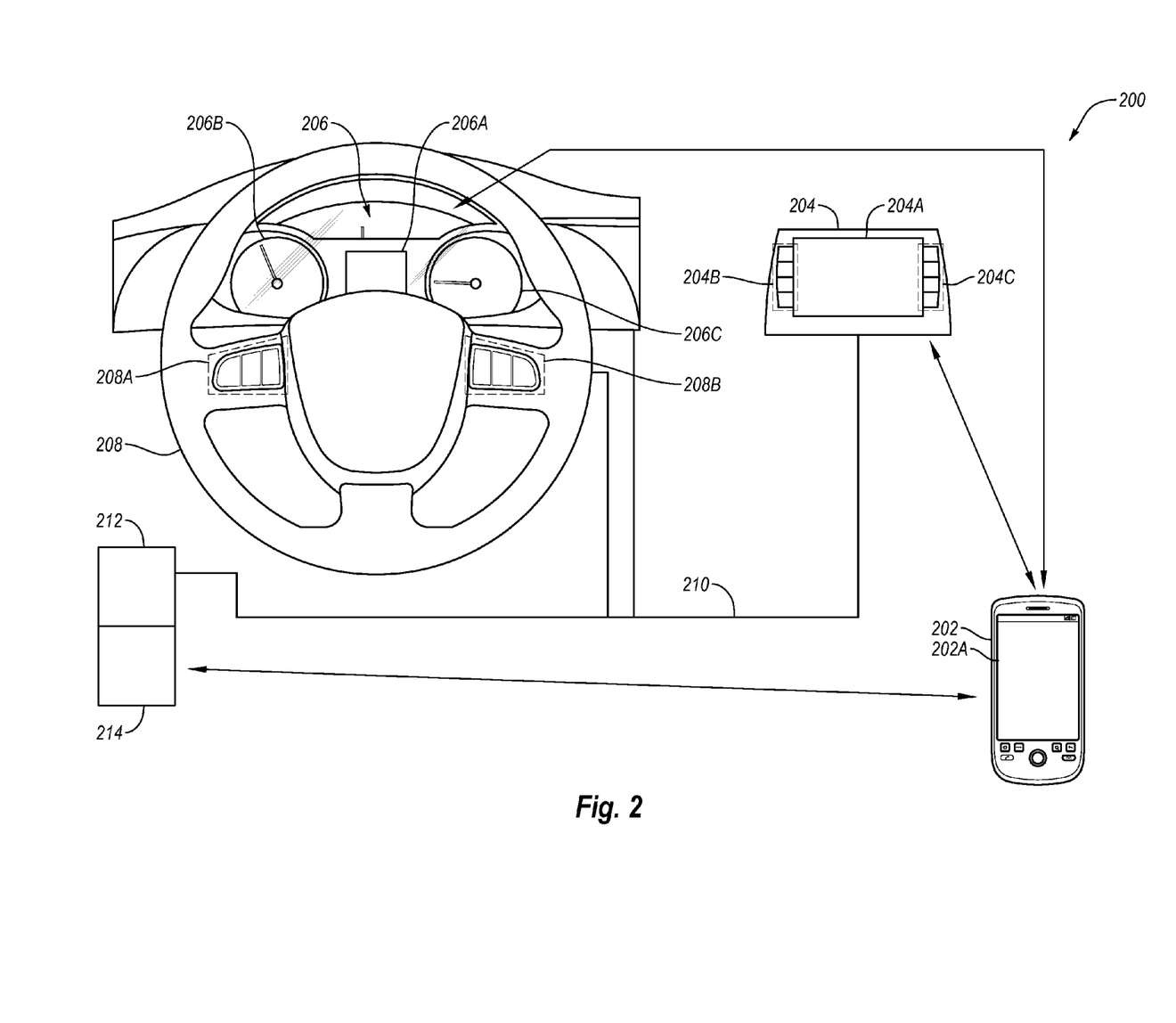
FIG. 2 is a diagrammatic view of an example course-based searching system such as may be implemented in the operating environment of FIG. 1.

FIG. 2 is a diagrammatic view of an example course-based searching system 200 such as may be implemented in the operating environment 100 of FIG. 1. The system 200 may be located within the interior of a vehicle that may generally correspond to the vehicle 102 of FIG. 1. The system 200 includes a mobile device 202 that may generally correspond to the mobile device 110 of FIG. 1. The mobile device 202 may include a display 202A. The display 202A may function as an input interface for the mobile device 202 when implemented as a touchscreen display.

The system 200 may additionally include one or more vehicular display devices 204 and 206. More particularly, the vehicular display devices 204 and 206 respectively include a head unit 204 and an instrument panel 206 in the illustrated embodiment. The vehicular display devices 204 and 206 are generally vehicular display devices that can be found in new and used vehicles. The principles and operation of the embodiments of the invention described herein can be adapted for use with existing vehicular display devices and generally do not require the cooperation of the vehicle manufacturer. In some cases, the existing vehicular display devices 204 and 206 can be equipped or retrofitted with a wireless interface or other communication device as further described herein to facilitate communication with mobile device 202. In other cases, the vehicular display devices 204 and 206 included in new vehicles are adapted by the manufacturer to facilitate the communication.

The head unit 204 includes a display 204A configured to display content such as video content from an integrated DVD player, radio or other music information, weather or traffic information, etc. For example, the display 204A may be associated with an existing built-in electronics system that has certain functionality, which is often limited or outdated in the absence of the systems described herein. The head unit 204 additionally includes an input interface, which may include any input device configured to receive user input effective to operate the head unit 204 and potentially other aspects of the vehicle in which the head unit 204 is installed. For example, the input interface of the head unit 204 includes one or more buttons 204B, 204C and/or the display 204A itself when implemented as a touchscreen display. In some embodiments, when the mobile device 202 is projecting content to the head unit 204, user input provided via the input interface of the head unit 204 is used to control operation of the mobile device 202.

The instrument panel 206 includes at least one display area 206A in which content may be displayed. Accordingly, the mobile device 202 may project content to the instrument panel 206 for display in all or a portion of the display area 206A. Alternately or additionally, the instrument panel 206 may further include one or more fixed instruments 206B and 206C. For example, the fixed instruments 206B and 206C may include a speedometer, a fuel gauge, a temperature gauge, an RPM gauge, or the like or any combination thereof. Although not shown, in some embodiments, the instrument panel 206 may include an input interface such as has been described with respect to the head unit 204.

The system 200 may further include a steering wheel 208 of the vehicle. In some embodiments, the steering wheel 208 includes an input interface such as has been described above with respect to the head unit 204. The input interface of the steering wheel 208 may include one or more buttons 208A and 208B. In some embodiments, the buttons 208A and 208B are used for one or more of prompting the vehicle to listen for a voice command, speaker volume control, channel selection, track selection, or for other functionality.

In some embodiments, the system 200 further includes an intra-vehicle bus 210 to which the head unit 204, the instrument panel 206 and/or the steering wheel 208 are communicatively coupled. The intra-vehicle bus 210 may be configured to allow microcontrollers such as may be implemented in each of the head unit 204, the instrument panel 206 and the steering wheel 208, to communicate with each other. The intra-vehicle bus 210 may include a controller area network (CAN) bus or any bus used in a vehicle for communicating signals between components, including standards such as media oriented systems transport (MOST), local interconnect network (LIN), Inter-Integrated Circuit (I²C), Ethernet, or the like.

An access node 212 may be provided to allow access to the intra-vehicle bus 210. For example, an intra-vehicle bus interface (IVBI) device 214 may be communicatively coupled to the access node 212 to read data from and/or write data to the intra-vehicle bus 210. In an example embodiment, the access node 212 may include an on-board diagnostics (OBD) connector compliant with a particular OBD interface, such as the OBD-I, OBD-1.5, or OBD-II interfaces. The IVBI device 214 may be configured to communicate with the mobile device 202 wirelessly or via a hardwired connection.

In some embodiments, user input entered via the buttons 208A and 208B of the steering wheel 208 and/or entered via other input interfaces of the vehicle may be used to control operation of the mobile device 202. For example, data representing the user input may be communicated on the intra-vehicle bus 210, read by the IVBI device 214, and communicated by the IVBI device 214 to the mobile device 202 either wirelessly or via a hardwired connection.

The system 200 tracks a location of the vehicle. In some embodiments, the location of the vehicle is tracked by the mobile device 202. Alternately or additionally, the location of the vehicle may be tracked by a navigation device of the vehicle. The system 200 may track the location of the vehicle continuously or intermittently.

The system 200 also tracks a course of the vehicle. The course of the vehicle may be based on any information that describes an actual and/or projected change in a vehicle's location. The system 200 may track a heading of the vehicle via a compass or other device of the vehicle or the mobile phone 202. The system 200 may also track speeds of the vehicle including average speeds, instantaneous speeds, and the like. The system 200 may receive the vehicle's speed via the intra-vehicle bus 210 or via a navigation device of the mobile phone 202. The course may include predicted routes, proposed routes, and the like. In tracking the vehicle's course, the system 200 may also consider speed limit, weather, and/or traffic information gathered from one or more resources such as the Internet.

In some embodiments, the course may include a driving profile of an operator of the vehicle. The driving profile may include information about driving habits and preferences of the operator that may be used in projecting the vehicle's course. The system 200 may further contain information about a destination of the vehicle. The destination may be input from an occupant, inferred by the system 200 based on an occupant's past and/or current behavior, or the like. In some embodiments, the course may be based on a route the system 200 projects the vehicle is likely to take. The course may also be based on a proposed route provided to the occupants of the vehicle. The proposed route may include navigation instructions for traveling to a destination. Information describing the course of the vehicle is not limited to the information explicitly disclosed herein; the course may include other information describing actual or projected changes in the vehicle's location.

The system 200 may request places from a resource based on the location of the vehicle and a search criterion. In some embodiments, the system may perform the request as a location-based search via the mobile phone 202. The resource may include a network resource such as a location-based search engine such as Google Maps, Yelp, Bing Maps, or the like. The system 200 may perform the request via an application programming interface (API) of the location-based search engines. The system 200 may receive multiple places from the resource in response to the request. In some embodiments, these multiple places may be located in an area centered on the vehicle's location and may include results less relevant to the occupant. The system 200 may return one or more of the received places to an occupant of the vehicle based on the course of the vehicle such that the returned places are more relevant to the occupant. In some embodiments, an application on the mobile device 202 may identify which of the multiple received places to return to the occupants.

The system 200 may determine which of the multiple places to return to the occupants based on the course of the vehicle. In some embodiments, the system 200 may return one or more places associated with locations that require the vehicle to deviate from the course by less than an acceptable threshold to reach. Places received from the resource that require the vehicle to deviate from the course by more than the acceptable threshold may not be returned to the occupant.

The threshold may be set by an occupant or by the system 200. In some embodiments, the acceptable threshold may be generated and/or changed by the system 200. The threshold may be defined as a distance, a time, or some other measurement. For example, the system 200 may consider any deviation from the course that takes less than five minutes of travel time to be within an acceptable threshold. Similarly, the system 200 may consider any deviation from the course that adds less than one mile to the vehicle's course to be within an acceptable threshold. Alternately or additionally, thresholds may be defined as a portion of a trip length. For example, the system 200 may consider any deviation from the course that is projected to increase the travel time or travel distance by less than five percent to be within an acceptable threshold.

In some embodiments, the system 200 may consider the preferences of the occupant in determining an acceptable threshold. The system 200 may monitor the historical actions of the occupant, including past deviations from past trips, to determine a threshold acceptable to the particular occupant. For example, as the system 200 performs course-based place searches as described herein over a period of time, the system 200 may consider the places actually chosen by the occupant. If the occupant rarely chooses places at or near the threshold, the acceptable threshold may be lessened such that places requiring less deviation from the course of the vehicle are returned in future course-based searches. Conversely, if the occupant often chooses places at or near the threshold, the acceptable threshold may be increased such that places requiring more deviation from the course of the vehicle are returned in future course-based searches.

The occupant's preferences may be monitored even when the occupant is not performing course-based searches. For example, the system 200 may use a navigation device to monitor the places the occupant frequents to determine the occupant's brand preferences, food preferences, route preferences, and the like.

The returned places may be associated with locations located in a direction of the heading of the vehicle, or in a direction that includes an acceptable deviation from the heading of the vehicle. Places associated with locations requiring the vehicle to deviate from the heading of the vehicle by more than an acceptable threshold to reach are not returned. Similarly, the returned places may be associated with locations located along a predicted route or with locations requiring the vehicle to deviate from the proposed route by an acceptable threshold to reach. Places associated with locations requiring the vehicle to deviate from the predicted route by more than an acceptable threshold to reach are not returned.

In some embodiments, the course may include a proposed route of the vehicle. For example, the course may include a proposed route presented to the occupant to direct the occupant to a destination. The returned places may be associated with locations located along the proposed route, or locations requiring the vehicle to deviate from the proposed route by less than an acceptable threshold to reach. Places associated with locations requiring the vehicle to deviate from the proposed route by more than the acceptable threshold are not returned.

In some embodiments, determining the required deviation from a course for each place may be accomplished by comparing projected routes to and from each place. For example, if the course includes a proposed route to a destination, the deviation may be determined for each place by acquiring an alternate route to the destination by way of each place and comparing the alternate routes to the proposed route. The alternate routes may be requested from a resource such as a navigation-based search engine such as Google Maps or Bing Maps. However, other methods of determining the required deviation may be used.

The returned places may be further based on characteristics of the places, a status of the vehicle and/or the preferences of an occupant. In some instances, places may not be returned if the occupant is unlikely to select the places and/or there are a suitable number of alternative places. For example, if the occupant never patronizes a particular brand of restaurant that has been returned to the occupant, the system 200 may stop returning that particular brand of restaurant. Optionally, the system 200 may return places that have received suitable reviews, are in a particular price range, or the like. For example, the system may receive pricing information and reviews as part of the location-based search, or may request reviews from a suitable resource such as Yelp, Citysearch, or the like.

In some embodiments, a preference of an occupant may include a time the occupant prefers to visit a place. The time the occupant prefers to visit a place may be identified automatically or may be identified by the occupant. For example, the occupant may prompt the system 200—by voice activation or another input—to "find good Chinese food an hour away." In response, the system 200 may return places associated with Chinese restaurants located near a location the vehicle is expected to be in one hour. The expected location of the vehicle may be based on the course of the vehicle.

The system 200 may also return places based on a status of the vehicle. The status of the vehicle may be requested by the mobile device 202 through the IVBI device 214. In some instances, the status of the vehicle may cause the system 200 to automatically request places from a resource and return one or more of the received places to the occupant of the vehicle. For example, if the vehicle senses a problem with the engine that requires attention (often indicated by a "check engine" light on the vehicle display 206), the system 200 may automatically request places associated with vehicle repair. The system 200 may return vehicle repair places that might fix the sensed problem on the particular make of vehicle. The vehicle repair places may be returned based on the course of the vehicle as described herein, but in some instances, the closest vehicle repair places may be returned regardless of course if the sensed problem requires urgent attention.

The system 200 may return places associated with replacing energy reserves of the vehicle. The energy reserves of the vehicle may include gasoline, diesel fuel, LPG, CNG, LNG, methanol, ethanol, biodiesel, hydrogen, electricity, and/or other energy sources for powering the vehicle. In some embodiments, the system 200 may retrieve information via the intra-vehicle bus 210 identifying the energy source(s) the vehicle employs. In requesting and/or returning places associated with energy-dispensing stations, the system 200 may use the information about the energy source(s) to return relevant results.

In some embodiments, the system 200 may retrieve information about the energy reserves of the vehicle via the intra-vehicle bus 210. The system 200 may determine an expected range of the vehicle based on the energy reserves of the vehicle, the projected speeds of the vehicle, projected elevation changes, weather, traffic, and the like. The system 200 may automatically request places associated with energy-dispensing stations as the energy reserves of the vehicle are consumed. In some embodiments, the system 200 may automatically return energy-dispensing stations within the expected range of the vehicle if the energy reserves are close to being depleted. Alternately or additionally, the system 200 may issue an alert if the vehicle is approaching a final energy-dispensing station within the vehicle's expected range.

Optionally, the system 200 may request the cost associated with the desired energy source at the various energy-dispensing stations via a resource such as a website listing the gasoline prices of gasoline-dispensing stations. The system 200 may then return the energy-dispensing stations based on the cost of purchasing energy from the stations. For example, if multiple stations are located on the vehicle's route, the system 200 may return the stations with the lowest cost. The system 200 may also selectively return membership-based energy-dispensing stations such as those available through Costco Wholesale and Sam's Club based on whether the occupant is a member. In some embodiments, if the vehicle requires an electricity-dispensing station ("charging station") to replenish the vehicle's energy reserves, the system 200 may check charging station availability and/or reserve a charging station via a resource such as the Internet.

The system may return the one or more places to the occupant by displaying information about the places on the display 204A and/or 202A. Alternately or additionally, information about the places may be returned audibly through a sound system of the vehicle. When displayed, the one or more places may be displayed on a map, in a list, in tiles, or some other organized manner that may be easily reviewed by an occupant of the vehicle. In some embodiments, occupants may review the places by navigating through information about the returned places using buttons 204B, 204C, 208A, and 208B; displays 202A and 204A when the displays 202A and 204A are implemented as touchscreens; and voice commands. Returning the places may include sorting the places by some criteria. For example, the places may be sorted according to a customer review rating, price, distance, or the like. In some embodiments, the places may be sorted according to the length of the detour required to reach each place. Alternately or additionally, the places may be sorted based on a best guess by the system 200 of what place the occupants will select.

Figure 3:
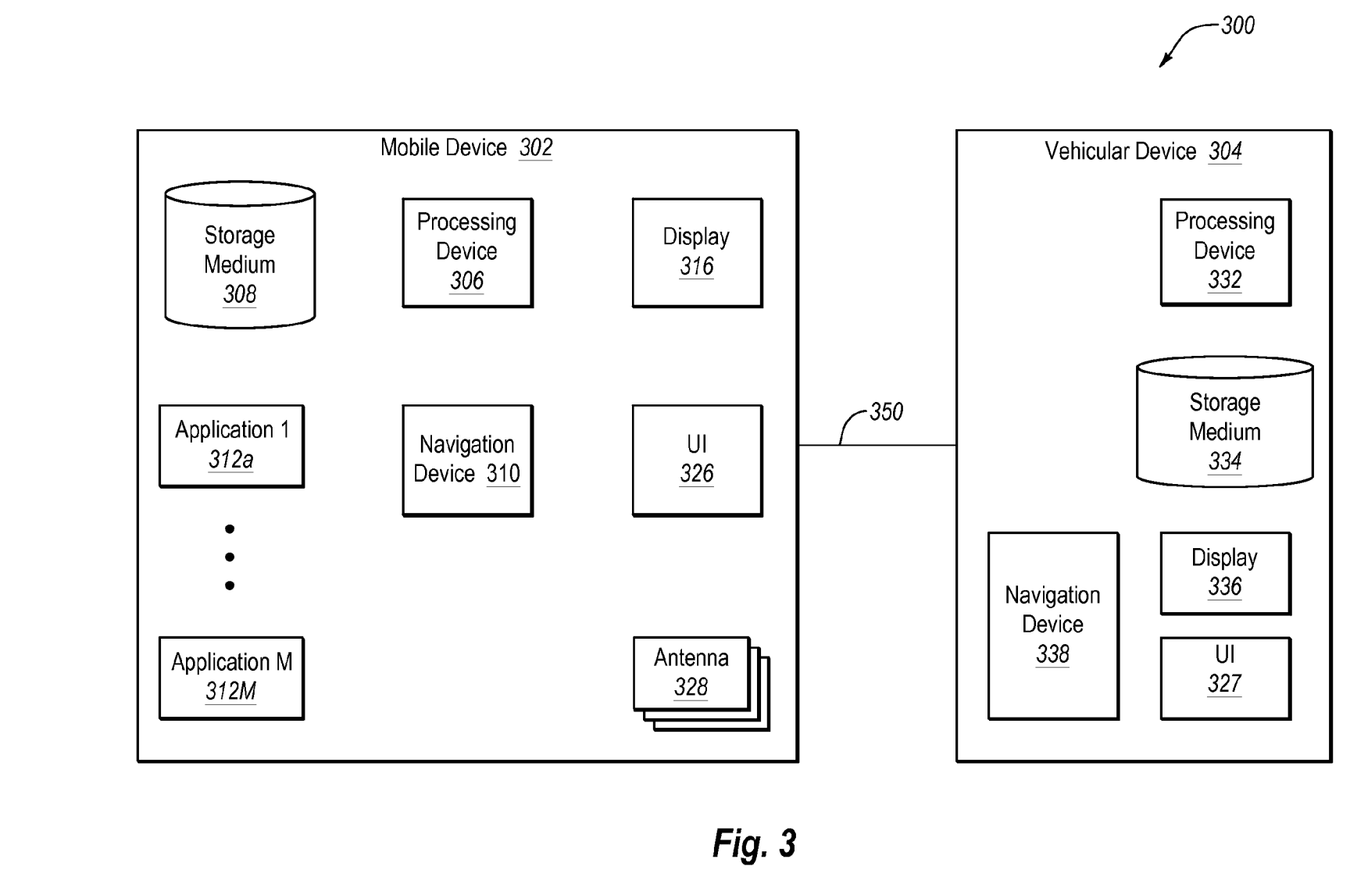
FIG. 3 is a block diagram of another example course-based searching system such as may be implemented in the operating environment of FIG. 1.

FIG. 3 is a block diagram of another example course-based searching system 300 such as may be implemented in the operating environment of FIG. 1. Additionally, the system 300 may generally correspond to the system 200 of FIG. 2. Accordingly, the system 300 includes a mobile device 302 which may generally correspond to the mobile device 110 of FIG. 1 and/or the mobile device 202 of FIG. 2. The system 300 also includes a vehicular device 304, which may generally correspond to any of the devices 104, 204 and/or 206 of FIGS. 1 and 2.

The mobile device 302 includes a processing device 306 and a computer-readable storage medium 308 (hereinafter "storage medium 308"). The processing device 306 is configured to execute computer instructions stored on the storage medium 308 to perform one or more of the operations described herein, such as operations associated with performing a course-based search. Although not illustrated in FIG. 3, the processing device 306, the storage medium 308, and/or the other components of the mobile device 302 may be communicatively coupled via a communication bus. The communication bus may include, but is not limited to, a memory bus, a storage interface bus, a bus/interface controller, an interface bus, or the like or any combination thereof.

The storage medium 308 may include, but is not limited to, a magnetic disk, a flexible disk, a hard-disk, an optical disk such as a compact disk (CD) or DVD, and a solid state drive (SSD) to name a few. Another example of a computer-readable storage medium that may be included in the mobile device 302 may include a system memory (not shown). Various non-limiting examples of system memory include volatile memory such as random access memory (RAM) or non-volatile memory such as read only memory (ROM), flash memory, or the like or any combination thereof.

One or more applications 312a-312M (collectively "applications 312") may be executed by the mobile device 302, and, more particularly, by the processing device 306. For example, the applications 312 may be stored in the storage medium 308 and executed by the processing device 306 to become corresponding instantiated applications that generate or render information or content locally or communicate information or content with an external information or content resource.

The mobile device 302 may be controlled via a UI 326 of the mobile device 302. Additionally, the mobile device 302 may be configured to output content to a built-in display 316.

The mobile device 302 includes one or more antennas 328 configured for wireless communication. The antennas 328 may be configured to communicate with the vehicular device 304. For example, the antennas 328 may permit communication through a communication channel 350. In some embodiments, the communication channel 350 includes the IVBI device 214, the access node 212, and the intra-vehicle bus 210 of FIG. 2. The antennas 328 also allow the mobile device 302 to communicate over a wireless network generally corresponding to the network 106 of FIG. 1. The antennas 328 may allow the mobile device 302 to request places from a network resource.

The mobile device 302 includes a navigation device 310. The navigation device 310 may include hardware and/or software necessary to determine a location and/or course of the mobile device 302. For example, the navigation device 310 may include hardware and/or software to determine a location and/or course from GPS, GLONASS, LORAN, WPS, and the like. The navigation device 310 may include other devices related to determining a location and/or course of the mobile phone 302, such as a compass, gyroscope, accelerometer, and the like.

The vehicular device 304 includes a processing device 332 and a computer-readable storage medium 334 (hereinafter "storage medium 334"). The processing device 332 is configured to execute computer instructions stored on the storage medium 334 to perform one or more of the operations described herein, such as operations associated with performing a course-based search. Although not illustrated in FIG. 3, the processing device 332, the storage medium 334, and/or the other components of the vehicular device 304 may be communicatively coupled via a communication bus. The communication bus may include, but is not limited to, a memory bus, a storage interface bus, a bus/interface controller, an interface bus, or the like or any combination thereof.

The vehicular device 304 may further include a display 336 generally corresponding to one or more of the displays 204A and 206A of FIG. 2. The vehicular device 304 may be controlled via a UI 327 of the vehicular device 304. Additionally, the vehicular device 304 may be configured to output content to a built-in display 336. In some embodiments, the UI 327 of the vehicular device 304 is used to control the mobile device 302 and the mobile device 302 outputs content to the display 327 of the vehicular device 304.

Optionally, the vehicular device 304 may include a navigation device 338. The navigation device 338 may include hardware and/or software necessary to determine a location and/or course of the vehicular device 304. For example, the navigation device 338 may include hardware and/or software to determine a location and/or course from GPS, GLONASS, LORAN, WPS, and the like. The navigation device 338 may include other devices related to determining a location and/or course of the vehicular device 304, such as a compass, gyroscope, accelerometer, and the like.

Figure 4A:
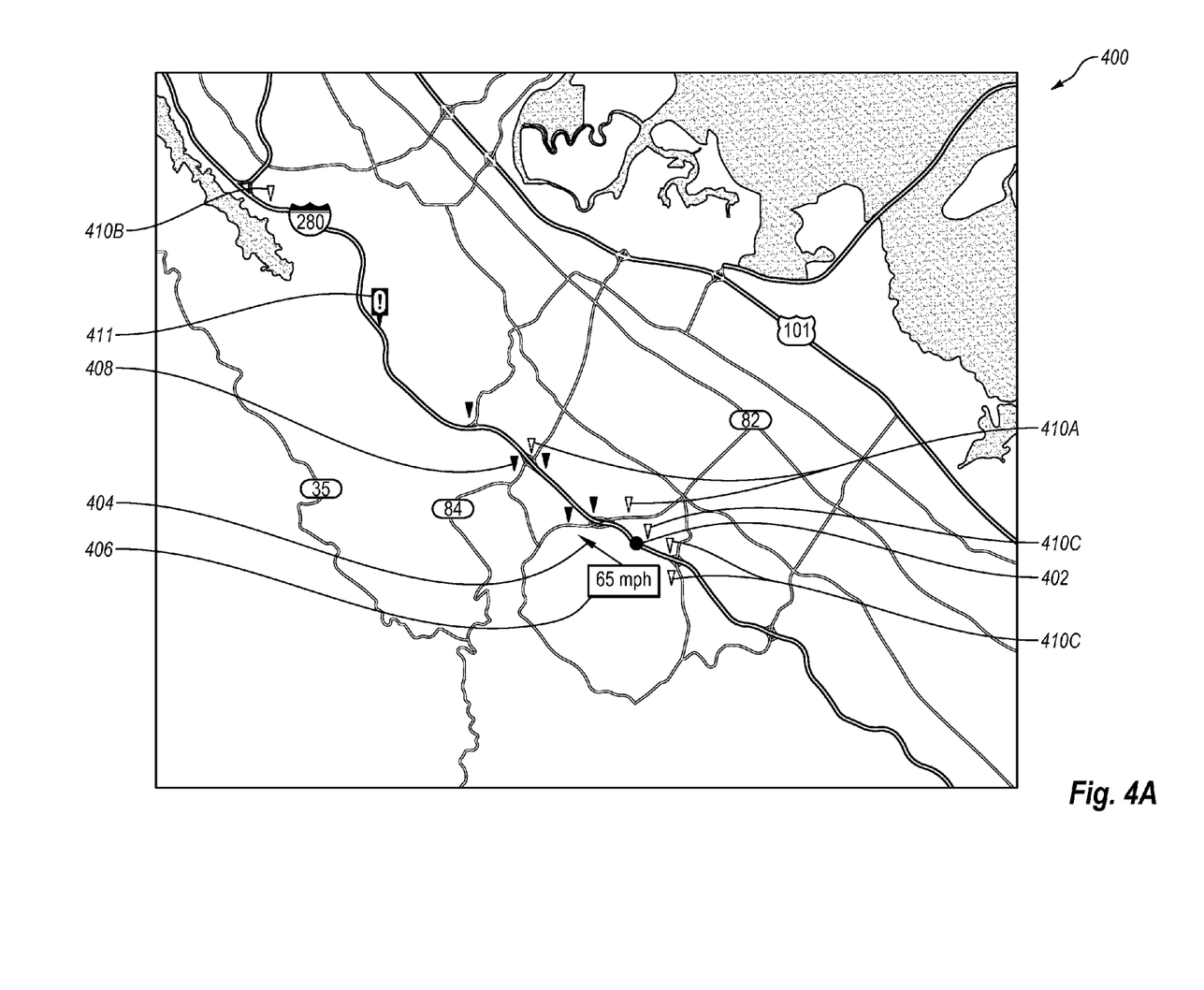
FIG. 4A illustrates an example map such as may be displayed by the example course-based searching systems of FIG. 2 and FIG. 3.

FIG. 4A illustrates an example map 400 such as may be displayed by the example course-based searching systems 200 and 300 of FIG. 2 and FIG. 3. The map 400 may be displayed on a display generally corresponding to the displays 202A and/or 204A of FIG. 2, for instance. The map 400 may include a marker indicating a location of a vehicle 402 generally corresponding to the vehicle 102 described with reference to FIG. 1. Optionally, the map 400 may include heading 404 and speed 406 information. However, the heading 404 and speed 406 may be omitted from the map 400. A course-based search such as described herein may consider the heading 404 and speed 406 as information describing the vehicle 402 course.

As a result of a course-based search, the map 400 may include place markers 408 representing places received from a location-based search that are located along a predicted route based on the heading 404 of the vehicle 402 or requiring deviation from the predicted route by an acceptable threshold to reach, as indicated by the place markers 408 with solid fill. Other places may be received from the location-based search, but are omitted from being displayed on the map 400, as indicated by the hatched place markers 410A-410C (hereinafter collectively "omitted places 410").

The omitted places 410 may be omitted for any of a variety of reasons. For example, the omitted places 410C may be omitted because they require the vehicle 402 to deviate from the predicted route by more than an acceptable threshold to reach. Alternately or additionally, the omitted places 410A may be omitted because they do not satisfy the occupant's preferences, for example. Alternately or additionally, the omitted place 410B may be omitted because the distance to the omitted place 410B is beyond an expected range of the vehicle 402 based on the energy reserves of the vehicle 402. Optionally, the map 400 may include a marker 411 indicating the location at which the vehicle 402 is projected to deplete its existing energy reserves.

Alternately or additionally, the marker 411 may include a circle centered on the vehicle 402 representing the estimated range of the vehicle 402 in all directions. In some embodiments, all places falling outside of the estimated range circle may be omitted from the map 400. For example, if the vehicle 402 is low on energy reserves and no destination is set, an estimated range circle may automatically be added to the map 400. The estimated range circle may shrink as the energy reserves of the vehicle 402 are consumed and the estimated range decreases.

Figure 4B:
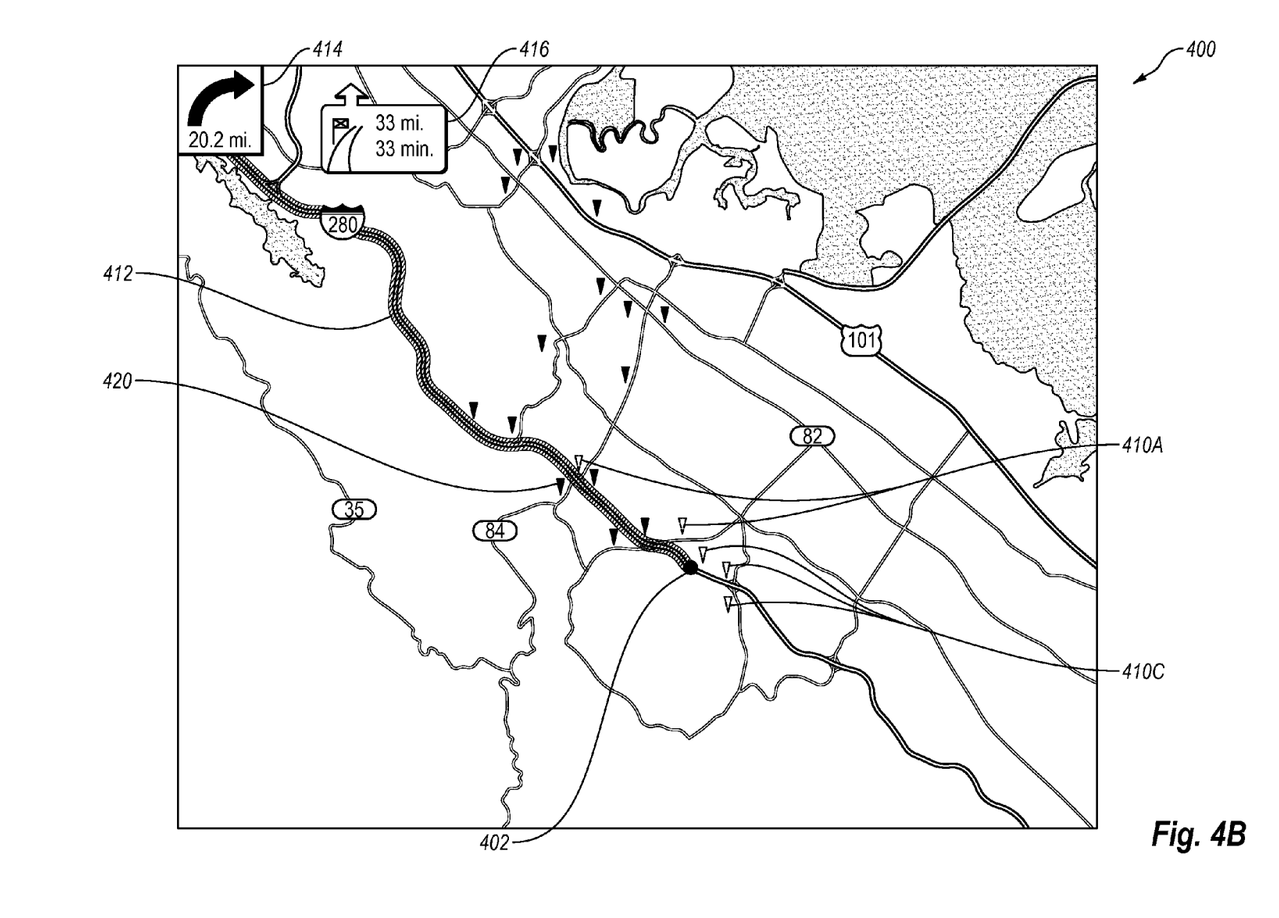
FIG. 4B illustrates the example map of FIG. 4A including a proposed route.

FIG. 4B illustrates the example map 400 including a proposed route 412. The map 400 may include the proposed route 412 and navigation instructions 414 directing an operator of the vehicle to a destination generally designated at 416. As a result of a course-based search, the map 400 may include place markers 420 representing places received from a location-based search that are located along the proposed route 412 or requiring deviation from the proposed route 412 by an acceptable threshold to reach, as indicated by the place markers 420 with solid fill.

Figure 4C:
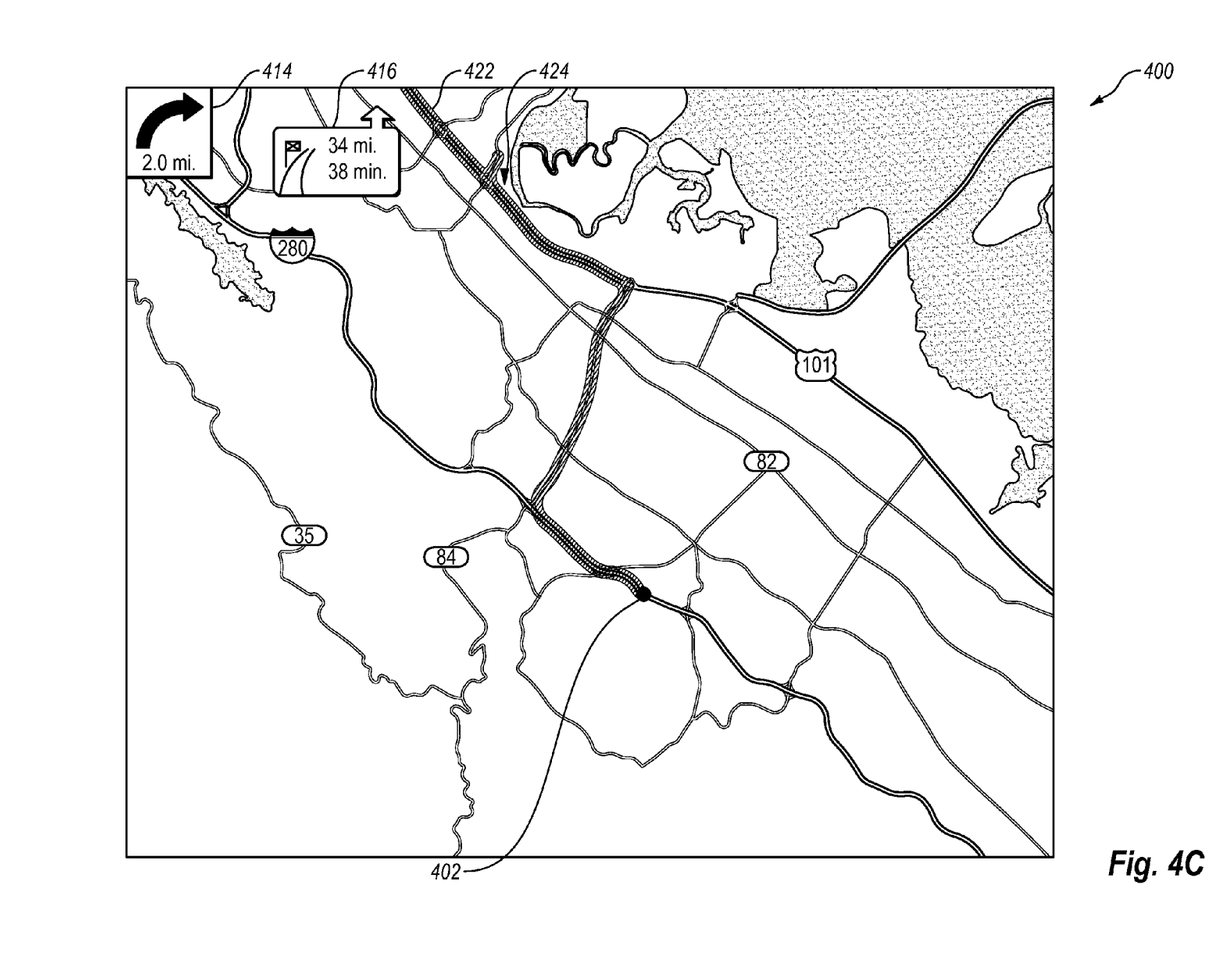
FIG. 4C illustrates the example map of FIG. 4B including an updated proposed route.

FIG. 4C illustrates the example map 400 of FIG. 4B including an updated route 422. The updated route 422 may be determined based on the selection of the place 424 from amongst all the places 420 returned as a result of the course-based search. As illustrated in FIG. 4C, traveling to place 424 may add only one mile of distance and five minutes of travel time to the destination 416 when compared to the proposed route 412 shown in FIG. 4B.

Figure 5:
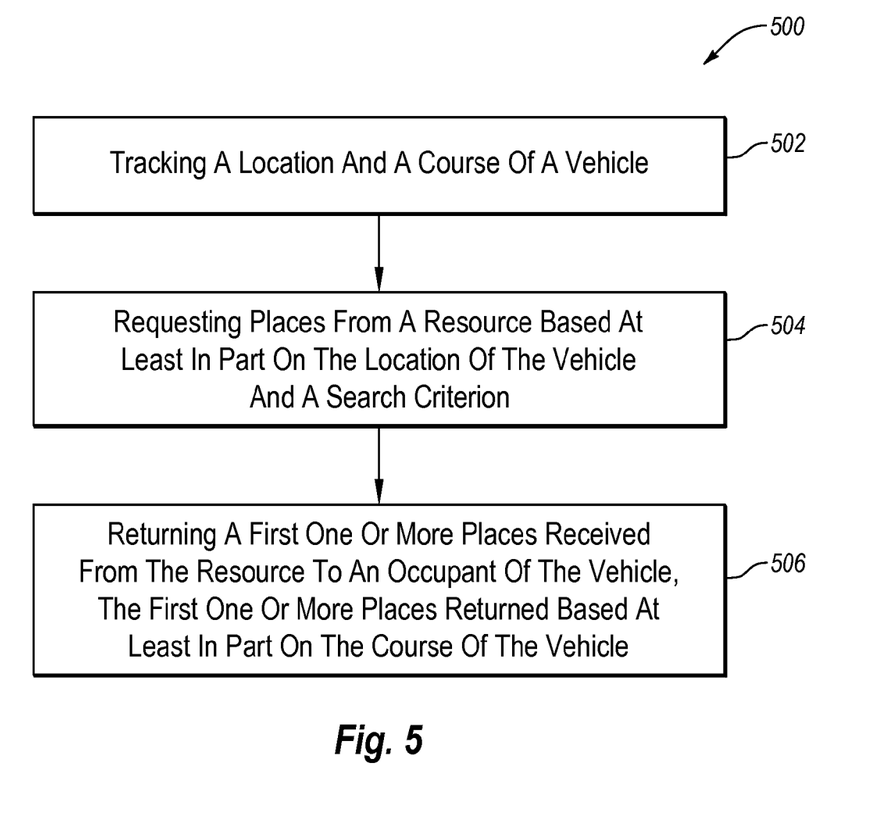
FIG. 5 is a flowchart of an example method of performing a course-based place search.

FIG. 5 is a flowchart of an example method 500 of performing a course-based place search. The method 500 may be implemented by a special purpose or a general-purpose computer or a system, such as the system 300 of FIG. 3. Although FIG. 5 is illustrated as discrete blocks, various blocks may be divided into additional blocks, combined into fewer blocks, or eliminated, depending on the desired implementation.

The method 500 may begin at block 502, in which a location and a course of a vehicle are tracked.

In block 504, places are requested from a resource based at least in part on the location of the vehicle and a search criterion.

In block 506, a first one or more of places received from the resource are returned to an occupant of the vehicle. The first one or more places returned are based at least in part on the course of the vehicle. In some embodiments, the first one or more places may be returned such that a second one or more places received from the resource are not returned. The second one or more places may require the vehicle to deviate from the course by more than an acceptable threshold to reach the second one or more places.

In some embodiments, the first one or more places returned may be further based at least in part on a preference of the occupant of the vehicle. Alternately or additionally, the first one or more places may be further based at least in part on a status of the vehicle, or on detailed information about the places received from the resource.

In some embodiments, the course may include a heading of the vehicle. The first one or more places may be associated with locations located along a predicted route of the vehicle or locations requiring the vehicle to deviate from the predicted route by an acceptable threshold to reach the first one or more places. The predicted route may be based at least in part on the heading of the vehicle. A second one or more places received from the resource may not be returned. The second one or more places may be associated with locations requiring the vehicle to deviate from the predicted route by more than an acceptable threshold to reach the second one or more places. The second one or more places may be filtered from the returned results by the resource. Alternately, the second one or more places may be filtered from the returned results locally, e.g., by the system 300.

In some embodiments, the course may include a proposed route of the vehicle. The proposed route may include navigation instructions from the location of the vehicle to a destination. The first one or more places may be associated with locations located along the proposed route of the vehicle or locations requiring the vehicle to deviate from the proposed route by an acceptable threshold to reach the first one or more places. A second one or more places received from the resource may not be returned. The second one or more places may be associated with locations requiring the vehicle to deviate from the proposed route by more than an acceptable threshold to reach the second one or more places.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the search criterion may be related to places providing energy for replenishing energy reserves of the vehicle. In these and other embodiments, the method 500 may further include retrieving information about the energy reserves of the vehicle. The first one or more places may be returned based at least in part on an expected range of the vehicle. The expected range of the vehicle may be based at least in part on the energy reserves of the vehicle.

The method 500 may further include tracking energy reserves of the vehicle and automatically returning the first one or more places in response, at least in part, to the energy reserves of the vehicle.

An embodiment of the method 500 of FIG. 5 in the context of the system 300 of FIG. 3 will now be described. In an example embodiment, the system 300 operates as follows. At the mobile device 302, the application 312a prompts the processing device 306 to request places from a resource via antennas 328. In requesting the places, the processing device 306 provides a search criterion and a location of a vehicle tracked via the navigation device 310 and/or 338. In response to the request, the mobile device 302 receives multiple places from the resource via the antennas 328.

A first one or more of the received places are returned to an occupant of the vehicle by way of the display 316 and/or 336. The mobile device 302 determines which first one or more places are returned to the occupant based at least in part on a course of the vehicle tracked via the navigation device 310 and 338.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to perform a course-based place search, the system comprising:
   a navigation device configured to track a location of a vehicle and a course of the vehicle;
   a processing device communicatively coupled to the navigation device and configured to request places from a resource based at least in part on the location of the vehicle and a search criterion and to return a first one or more places received from the resource to an occupant of the vehicle, the first one or more places returned based at least in part on the course of the vehicle; and
   a display communicatively coupled to the processing device on which the first one or more places are displayed.

2. The system of claim 1, wherein the processing device is further configured to sort the first one or more places based on a distance from the location to each result, based on a deviation from the course to each result, or based on both the distance from the location to each result and the deviation from the course to each result.

3. The system of claim 2, wherein the display is configured to display the first one or more places to the occupant in a list of the first one or more places arranged as sorted.

4. The system of claim 1, wherein the processing device is configured to request the places from the resource responsive to receiving input that includes the search criterion from the occupant.

5. The system of claim 4, wherein:
   the search criterion includes a time the occupant prefers to visit a type of place;
   the first one or more places returned to the occupant include one or more places located near a location the vehicle is expected to be at the time the occupant prefers to visit the type of place; and
   the location the vehicle is expected to be at the time the occupant prefers to visit the type of place is based on the course of the vehicle.

6. The system of claim 1, wherein the processing device is configured to automatically request places from the resource without input from the occupant and based on a status of the vehicle.

7. The system of claim 6, wherein the status of the vehicle indicates a potential vehicle repair and the first one or more places returned to the occupant include one or more vehicle repair places.

8. The system of claim 6, wherein the status of the vehicle indicates energy reserves of the vehicle and the first one or more places returned to the occupant include one or more energy-dispensing stations.

9. The system of claim 1, wherein the processing device is further configured to return the first one or more places such that a second one or more places received from the resource are not returned, the second one or more places requiring the vehicle to deviate from the course by more than an acceptable threshold to reach the second one or more places.

10. The system of claim 9, wherein the processing device is further configured to modify the acceptable threshold over time responsive to behavior of the occupant, including:
    decreasing the acceptable threshold responsive to the occupant rarely choosing places at or near the acceptable threshold over a period of time; and
    increasing the acceptable threshold responsive to the occupant often choosing places at or near the acceptable threshold over the period of time.

11. A method to perform a course-based place search, the method comprising:
- tracking a location of a vehicle and a course of the vehicle;
- requesting places from a resource based at least in part on the location of the vehicle and a search criterion; and
- returning a first one or more places received from the resource to an occupant of the vehicle, the first one or more places returned based at least in part on the course of the vehicle.

12. The method of claim 11, further comprising sorting the first one or more places based on a distance from the location to each result, based on a deviation from the course to each result, or based on both the distance from the location to each result and the deviation from the course to each result.

13. The method of claim 12, wherein returning the first one or more places to the occupant comprises displaying a list of the first one or more places arranged according to the sorting.

14. The method of claim 11, further comprising, prior to requesting places from the resource, receiving input that includes the search criterion from the occupant, wherein the places are requested from the resource responsive to receiving the input.

15. The method of claim 14, wherein:
- the search criterion includes a time the occupant prefers to visit a type of place;
- the first one or more places returned to the occupant include one or more places located near a location the vehicle is expected to be at the time the occupant prefers to visit the type of place; and
- the location the vehicle is expected to be at the time the occupant prefers to visit the type of place is based on the course of the vehicle.

16. The method of claim 11, wherein requesting places from the resource comprises automatically requesting places from the resource without input from the occupant and based on a status of the vehicle.

17. The method of claim 16, wherein the status of the vehicle indicates a potential vehicle repair and the first one or more places returned to the occupant include one or more vehicle repair places.

18. The method of claim 16, wherein the status of the vehicle indicates energy reserves of the vehicle and the first one or more places returned to the occupant include one or more energy-dispensing stations.

19. The method of claim 11, wherein the first one or more places are returned such that a second one or more places received from the resource are not returned, the second one or more places requiring the vehicle to deviate from the course by more than an acceptable threshold to reach the second one or more places.

20. The method of claim 19, further comprising monitoring places the occupant visits over time to determine brand preferences, food preferences, and route preferences of the occupant, wherein the first one or more places returned are further based on the occupant's brand preferences, food preferences, and/or route preferences.

* * * * *